US012543921B2

(12) United States Patent
Tütek

(10) Patent No.: US 12,543,921 B2
(45) Date of Patent: Feb. 10, 2026

(54) POLLUTION MEASURING SENSOR HOUSING

(71) Applicant: SERDAR PLASTİK SANAYİ VE TİCARET ANONİM ŞİRKETİ, Sincan/Ankara (TR)

(72) Inventor: Serdar Mustafa Tütek, Sincan/Ankara (TR)

(73) Assignee: SERDAR PLASTIK SANAYI VE TICARET ANONIM SIRKETI (TR)

( * ) Notice: Subject to any disclaimer, the term of this patent is extended or adjusted under 35 U.S.C. 154(b) by 315 days.

(21) Appl. No.: 18/318,750

(22) Filed: May 17, 2023

(65) Prior Publication Data

US 2023/0284864 A1    Sep. 14, 2023

Related U.S. Application Data

(63) Continuation of application No. 16/618,154, filed on Nov. 28, 2019, now abandoned.

(51) Int. Cl.
*G01N 33/18* (2006.01)
*A47L 15/42* (2006.01)
(Continued)

(52) U.S. Cl.
CPC ...... *A47L 15/4297* (2013.01); *B29C 45/1671* (2013.01); *G01N 33/18* (2013.01); *B29C 45/14336* (2013.01); *B29C 2045/14459* (2013.01); *B29K 2101/12* (2013.01); *B29K 2995/007* (2013.01); *B29L 2031/265* (2013.01)

(58) Field of Classification Search
CPC .......... G01N 33/18; B29C 2045/14459; B29C 45/14336; B29C 45/1671; B29K 2101/12; B29K 2995/007; B29L 2031/265; A47L 15/4297
See application file for complete search history.

(56) References Cited

U.S. PATENT DOCUMENTS 8,531,670 B2      9/2013  Schenkl et al.
11,800,964 B2 *  10/2023  Bernet ................ A47L 15/4297
(Continued)

FOREIGN PATENT DOCUMENTS

CN    104695175 A        6/2015
CN    104695175 B   * 12/2017  ............. D06F 34/22
(Continued)

*Primary Examiner* — Andre J Allen

(57) ABSTRACT

The sensor housing of the present invention comprises a body and a gasket providing complete sealing within the body. The body comprises a lateral protrusion defining a first side, a second side generally parallel to the first side, and a third side connecting the first side and the second side. The gasket comprises a first leg portion, a second leg portion and a connecting portion. The first leg portion and the second leg portion extend in opposite directions. The connecting portion extends laterally to form a bridge between the first leg portion and the second leg portion. Further, the connecting portion and the second leg portion enclose the first side and the third side of the lateral protrusion, leaving the second side unenclosed by the gasket. The first leg portion comprises a first protrusion and a second protrusion extending outwardly and laterally in the same direction.

2 Claims, 2 Drawing Sheets

(51) Int. Cl.
 *B29C 45/16* (2006.01)
 *B29C 45/14* (2006.01)
 *B29K 101/12* (2006.01)
 *B29L 31/26* (2006.01)

(56) References Cited

U.S. PATENT DOCUMENTS

2001/0002542 A1\* 6/2001 Sasano .................... D06F 34/22
 68/12.02
2021/0140936 A1\* 5/2021 Tütek .................... G01N 33/18

FOREIGN PATENT DOCUMENTS

| CN | 114407790 A | \* | 4/2022 | ............. B60R 11/00 |
| CN | 114468936 A | \* | 5/2022 | ......... A47L 15/4217 |
| DE | 102019128013 A1 | \* | 4/2021 | ........... B60R 19/483 |
| DE | 102023120417 A1 | \* | 2/2025 | |
| WO | WO2007070086 A1 | | 6/2007 | |

\* cited by examiner

POLLUTION MEASURING SENSOR HOUSING

BACKGROUND OF THE INVENTION

Present invention relates to sensor housing which is used in all white appliances such as dishwashers etc. and providing sealing within its structure wherein sensor providing a possibility to measure the water pollution doesn't require an additional component for a full sealing.

TECHNICAL FIELD OF THE INVENTION

The present invention relates to the housing in which the sensor measuring pollution of water used by the machine is installed and to sealing property of this housing in dishwashers and all similar white appliances.

PRIOR ART

There is a sensor measuring the pollution of water in dishwashers and all similar white appliances. The sealing of the housing in which this sensor is installed is provided by an additional O-ring and in this case, there may be leakage because of deformation of the O-ring during mounting or over time. When there is a leakage, firstly the sensor doesn't function properly and goes fully out of order after some time.

SUMMARY OF THE INVENTION

The subject matter of the present invention is pollution measuring sensor housing; wherein O-rings attached afterwards for sealing in present housings are deformed and lose their sealing capability, wherein the subject matter relates to providing complete sealing from 4 points by means of injecting TPV on the housing.

The present invention relates to the housing in which the sensor used in dishwashers and all similar white appliances is installed, and wherein it relates to providing complete sealing by injecting a second thermoplastic via 2K injection on the body without requiring any additional component.

It is characterized by injecting on the body and by producing via 2K injection on the body unlike the existing gasket systems.

DETAILED DESCRIPTION OF THE INVENTION

The subject of the invention relates to pollution sensor housing used in dishwashers and all similar white appliances and determining dirty water.

The subject matter of the present invention is pollution measuring sensor housing; wherein O-rings attached afterwards for sealing in present housings are deformed and lose their sealing capability, wherein the subject matter relates to providing complete sealing from 4 points by means of injecting TPV on the housing.

The present invention relates to the housing in which the sensor used in dishwashers and all similar white appliances is installed, and wherein it relates to providing complete sealing by injecting a second thermoplastic via 2K injection on the body without requiring any additional component such as O-ring etc. sealing members.

LIST OF REFERENCES

Figure 1:
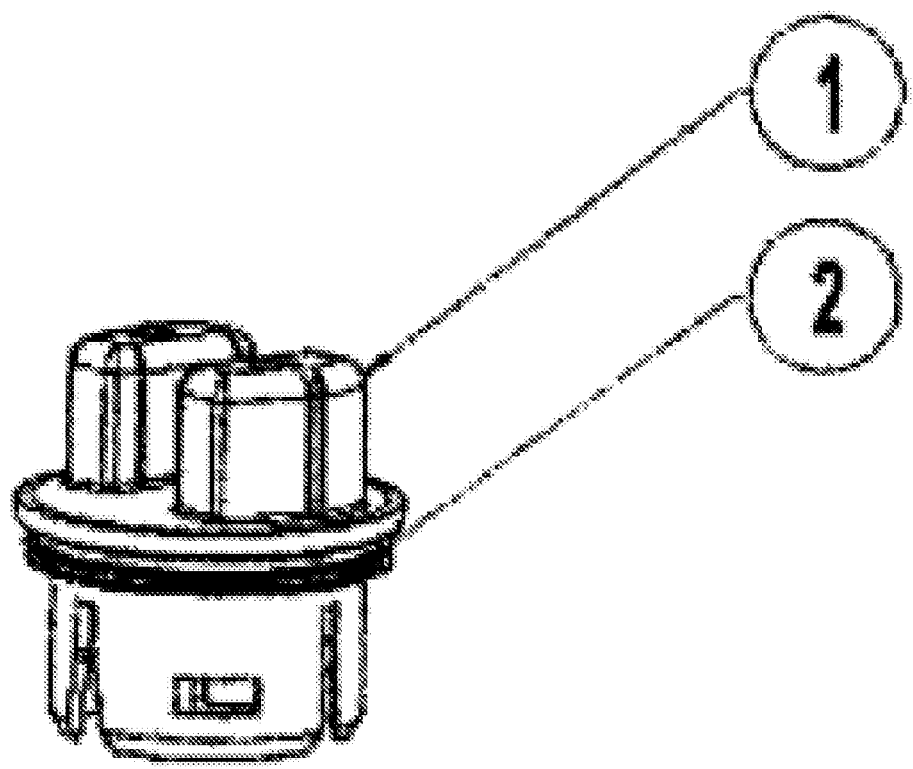
FIG. 1—is Perspective View of the Pollution Measuring Sensor Housing

1—Turbidity body
2—2K sealing gasket
3—Sealing gasket connecting tabs
4—a first leg portion
5—a second leg portion
6—a first protrusion
7—a second protrusion
8—an inclined surface
9—a first groove
10—a flat surface
11—a connecting portion
12—a lateral protrusion
13—a third side
14—a second side.
15—a first side
16—a second groove In FIG. 1, assembly view of the pollution measuring sensor is shown. Pollution measuring sensor is installed in the water tank in dishwashers etc. white appliances. The functionality of the sensor housing is to protect the sensor measuring the pollution of water in the tank from the water inside the water tank. The mounting is conducted by the connecting tabs (3) of the water tank engaging the tab housings on the sensor housing (1) shown in the picture.

Figure 2:
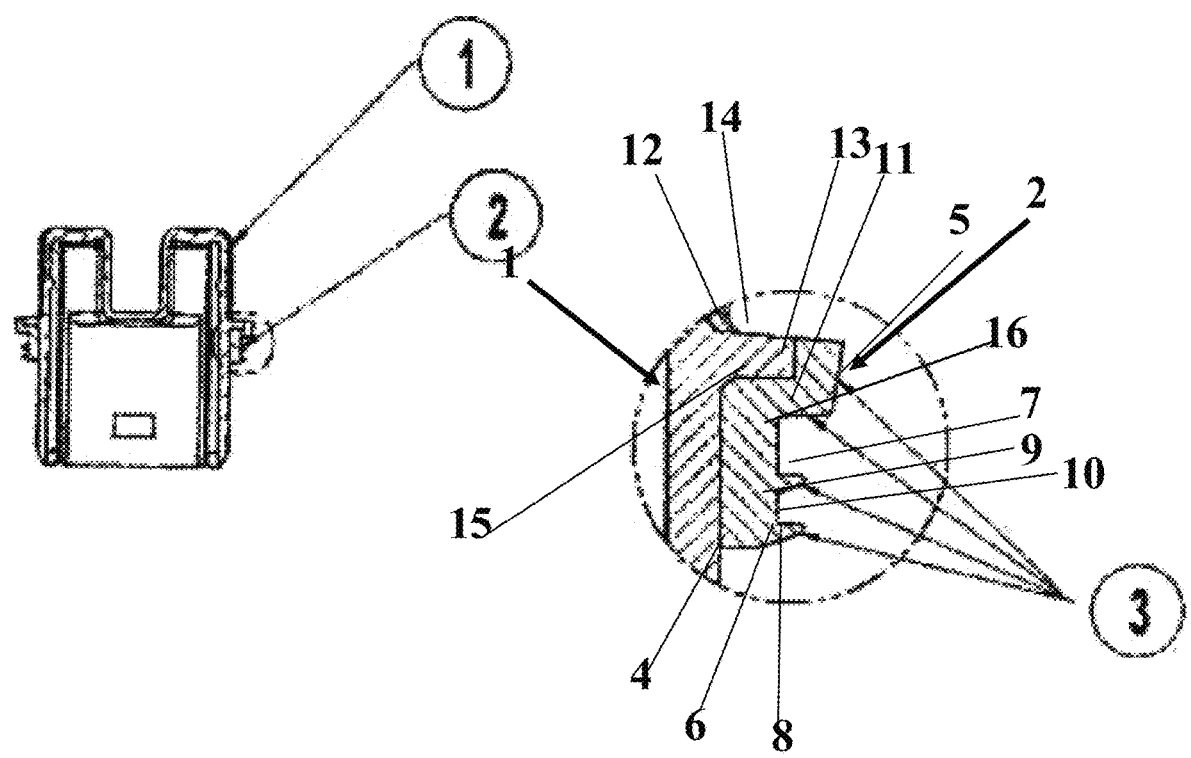
FIG. 2—is detailed view of the sealing gasket of the Pollution Measuring Sensor Housing

In FIG. 2, detail of the sealing gasket (2), which is produced by 2K injection, of the pollution measuring sensor housing is shown. In existing systems, an additional sealing member such as gasket, O-ring etc., whereas the present invention provides complete sealing from 4 points with the gasket located within the body. It provides 4 points sealing together with gasket lower surface and side surface that are fitted to the area where it is mounted to the water tank in addition to two sealing tie pieces shown in the Figure.

It has the body (1) used in dishwashers etc. all white appliance and determining the dirty water and has TPV (soft thermoplastic elastomer) 2K injection (2) injected on this body (1) unlike the existing sealing gaskets. When the body (1) is produced by injection, softer TPV (soft thermoplastic elastomer) is injected on it before removing from the mold thereby obtaining a single piece product made of two different materials.

The gasket (2) and the body (1) are now discussed in greater detail. In an embodiment, body (1) may comprise a body lateral protrusion (12) extending outwardly. The lateral protrusion (12) defines a first side (15), a second side (14), parallel to the first side (15), and a third side (13) connecting the first side (15) and the second side (14).

In an embodiment, the gasket (2) comprises a first leg portion (4), a second leg portion (5) and a connecting portion (11). The first leg portion (4) and the second leg portion (5) may extend in opposite directions. Further, the connecting portion (11) may extend laterally to form a bridge between the first leg portion (4) and the second leg portion (5). The connecting portion (11) and the second leg portion (5) may enclose the first side (15) and the third side (13) of the lateral protrusion (12), leaving the second side (14) unenclosed by the gasket (2).

In an embodiment, the first leg portion (4) may comprise a first protrusion (6) and a second protrusion (7). The first protrusion (6) and a second protrusion (7) may extend outwardly and laterally in the same direction. Each of the first protrusion (6) and the second protrusion (7) may be shaped to resemble a tooth having a flat surface (10) and an inclined surface (8). The first protrusion (6) may be provided at a distal end of the first leg portion (4). The second protrusion (7) may be provided between the first protrusion (6) and the connecting portion (11). The first protrusion (6) and the second protrusions (7) may be spaced apart to define a first groove (9). Further, the second protrusions (7) and the connecting portion (11) may be spaced apart to define a second groove (16). The flat surface (10) of each of the first protrusion (6) and the second protrusions (7) may face towards the connecting portion (11) and the inclined surface (8) of each of the first protrusion (6) and the second protrusions (7) may face away from the connecting portion (11).

What is claimed is:

1. A sensor housing used in white appliances, the sensor housing comprising:
   a body comprising a body lateral protrusion extending outwardly, the body lateral protrusion defining a first side, a second side parallel to the first side, and a third side connecting the first side and the second side; and
   a gasket providing complete sealing within the body, wherein the gasket comprises a first leg portion, a second leg portion and a connecting portion, wherein:
   the first leg portion and the second leg portion extend in opposite directions;
   the connecting portion extends laterally to form a bridge between the first leg portion and the second leg portion;
   the connecting portion and the second leg portion enclose the first side and the third side of the lateral protrusion, leaving the second side unenclosed by the gasket;
   the first leg portion comprises a first protrusion and a second protrusion extending outwardly and laterally in the same direction, each of the first protrusion and the second protrusion shaped to resemble a tooth having a flat surface and an inclined surface;
   the first protrusion is provided at a distal end of the first leg portion;
   the second protrusion is provided between the first protrusion and the connecting portion;
   the first protrusion and the second protrusions are spaced apart to define a first groove;
   the second protrusions and the connecting portion are spaced apart to define a second groove;
   the flat surface of each of the first protrusion and the second protrusions face towards the connecting portion; and
   the inclined surface of each of the first protrusion and the second protrusions face away from the connecting portion.

2. The sensor housing according to claim 1, wherein the gasket is made of a thermoplastic material (TPV) which is injected on the body via 2K injection.

\* \* \* \* \*